United States Patent [19]

Hood, Jr. et al.

[11] Patent Number: 4,629,005
[45] Date of Patent: Dec. 16, 1986

[54] BULB, ROOT, AND LEAFY VEGETABLE HARVESTER

[75] Inventors: Clarence E. Hood, Jr.; Robert E. Williamson, both of Clemson, S.C.; Amikam Margolin, Rishon Le Zion, Israel

[73] Assignee: Clemson University, Clemson, S.C.

[21] Appl. No.: 619,458

[22] PCT Filed: Oct. 22, 1982

[86] PCT No.: PCT/US82/01508
  § 371 Date: Dec. 1, 1983
  § 102(e) Date: Dec. 1, 1983

[51] Int. Cl.⁴ .................. A01D 33/08; A01D 31/00
[52] U.S. Cl. ...................................... 171/20; 171/25; 171/61; 171/62; 56/327 R
[58] Field of Search .................. 171/38, 61, 62, 20, 171/25, 60; 56/327 A, 327 R

[56] References Cited

U.S. PATENT DOCUMENTS

| | | | |
|---|---|---|---|
| 844,476 | 2/1907 | Seierup | 171/38 |
| 1,185,785 | 6/1916 | Ferguson | 171/61 |
| 1,190,598 | 7/1916 | Seierup | 171/61 X |
| 2,477,068 | 7/1949 | Motte | 171/61 |
| 2,645,889 | 7/1953 | Warner | 171/38 X |
| 3,521,710 | 7/1970 | Tillotson | 171/61 |
| 3,537,530 | 11/1970 | Bettencourt et al. | 171/1 |
| 3,586,108 | 6/1971 | Wedgeworth et al. | 56/327 R X |
| 3,693,721 | 9/1972 | Arnold et al. | 171/61 |
| 3,964,550 | 6/1976 | Storms | 171/61 |
| 3,989,110 | 11/1976 | Medlock et al. | 171/28 |
| 4,037,666 | 7/1977 | Rath | 171/61 |
| 4,113,022 | 9/1978 | Balinte et al. | 171/61 |
| 4,182,420 | 1/1980 | Hurliman et al. | 171/38 |

FOREIGN PATENT DOCUMENTS

| | | | |
|---|---|---|---|
| 1211630 | 11/1970 | United Kingdom | 171/25 |
| 697079 | 11/1979 | U.S.S.R. | 171/61 |

Primary Examiner—Robert A. Hafer
Assistant Examiner—Terrence L. B. Brown
Attorney, Agent, or Firm—Dority & Manning

[57] ABSTRACT

A harvester for bulb, root and leafy vegetable products including stationary blades (31, 32), rotatable discs (131, 132) or the like which are transported at an angle through opposite sides of a product plant bed to loosen the soil, cut the root system, and prepare the products for removal from the plant bed; a pair of opposing, rotatable belts (51, 51') which follow an inclined path and cooperate to define a product passageway therebetween, said belts (51, 51') defining a product lifting and transport section (41) in which adjustable, pressure pulleys (48, 48') ensure proper gripping pressure on the products, and a product orienting section (42) in which the products are transformed from a vertical to a horizontal disposition; support means (70) adjacent said product orienting section (42) for receiving tops of products oriented to a horizontal disposition; and conveyor means (75) adjacent an end of said product passageway for receiving freed, horizontally disposed product. A soil removal means (80) may also be employed beneath and axial to the product passageway along belts 51, 51' and includes an oscillatible rod (88) which vibrates the root system of the product to dislodge soil therefrom.

22 Claims, 6 Drawing Figures

BULB, ROOT, AND LEAFY VEGETABLE HARVESTER

BACKGROUND OF THE INVENTION

The present invention relates to a mechanical apparatus for the harvesting of bulb, root, and leafy vegetable products by appropriately dislodging same from the plant bed, conveying the dislodged product away from the plant bed, orienting same to a proper disposition and presenting same for placement into a suitable receptacle for further handling, processing or the like.

Row crops of such products, exemplified by green onions, carrots, radishes, turnip greens, mustard greens, and collard greens, are, in many cases, generally harvested by hand especially for fresh market sales.

Harvesters have been developed heretofore for the mechanical harvesting of onions and other products such as is described in *Western Grower and Shipper,* October 1977, pages 15 et seq. and in the Medlock et al U.S. Pat. No. 3,989,110. The onion harvester described in the article identified above which is entitled "Oshida Develops Green Onion Harvester", utilizes a square rotating breaker bar that is set to operate at a level from three to five inches below the surface, between two rows of onions. The bar rotates on a plane parallel to the rows of 400 to 500 revolutions per minute, to break the onion roots free from the soil. Thereafter, the onions are pulled from the ground by a set of opposing belts.

In the Medlock et al U.S. patent referred to above, a pair of twisted belts engage an upper portion of the onion at a forwardmost part of the apparatus, and a stationary blade located beneath the twisted belts penetrates the soil and severs or otherwise dislodges the onion bulb therefrom. Once dislodged, the onion is conveyed by the twisted belts into the throat of a pair of opposing rotating belts which lift the onion from the plant bed and convey same rearwardly and upwardly to a further series of oppositely facing conveyor belts, one of which is twisted to effect orientation of the onion from a vertical to a horizontal position.

In similar fashion, a harvester has previously been developed for the harvesting of leafy green vegetables as presented by D. L. Peterson, G. K. Brown, and A. K. Srivastava at the 1980 summer meeting of the American Society for Agricultural Engineers, June 15-18, 1980, San Antonio, Tex. ("Mechanical Harvester for Leafy, Green Vegetables", Transactions of the ASAE, vol. 24, (no. 2), pp. 312-314, 318). Gathering belts engage and hold the leaves while counter-rotating discs sever the leaves near ground level. Opposing belts then lift the severed leaves and orient the leaves to a horizontal position, after which the leaves are bunched and tied.

It is the type of harvesters described above that are improved by the present invention. Moreover, by virtue of the versatility of the present invention, same may be utilized for harvesting various bulb, root and leafy vegetable products, all without creating damage to the vegetable product. At the same time, a convenient and efficient means for harvesting and collecting the product for cleaning and/or future processing or packaging is provided.

It is submitted that the above prior art which is believed to be the most pertinent known to applicants does not teach or suggest the subject matter of the present invention.

SUMMARY OF THE INVENTION

It is an object of the present invention to provide an improved mechanical harvester for the harvesting of vegetable row crops, which crops must be dislodged from the plant bed or cut off at or above the plant bed level.

Another object of the present invention is to provide a mechanical harvester that is capable of being transported along a row of bulb, root of leafy vegetable products for the continuous harvesting of same.

Yet another object of the present invention is to provide an improved mechanical harvester for the harvesting of row crops which must be separated from the plant bed, and which harvester is adapted for the handling of the products without damage thereto, while at the same time reorientating the harvested product for convenient and efficient further handling of same.

Another object of the present invention is to provide an improved mechanical harvester that is capable of adjustment adequate to permit harvesting of various row crops of root, bulb, or leafy vegetable products.

Generally speaking, the harvester of the present invention for the harvesting of bulb, root, or leafy vegetable products comprises means for preparing said products for removal from a row plant bed in which said products are growing; angularly presented means located rearwardly of said product preparation means for engaging said prepared products, lifting said prepared products from said plant bed, and transporting said products in a vertical disposition upwardly and rearwardly; product orientation means located to receive vertically oriented product from said lifting and transport means, and orient said products to a horizontal disposition; first means located adjacent said product orientation means for supporting an upper end of said products only when said products are oriented to a horizontal disposition; and second means located adjacent an end of said product orientation means for receiving at least a portion of freed horizontally disposed products therefrom and conveying same away therefrom, whereby said horizontaly disposed products are then available for further processing or packaging.

More specifically, the harvester of the present invention preferably includes a transport carrier, such as a trailer having a skeletal frame, with all or a major portion of the harvester components mounted thereon. The trailer may be attached, for example, to a three point hitch of a tractor for movement along a crop row for the harvesting operation. Generally the means for preparing the products for removal from a plant bed may be mounted at a front end of the carrier, forward of the lifting and transport means, with the preparation means preferably being horizontally and vertically adjustable to accommodate various products. Alternatively, the preparation means may be mounted to the front of a tractor or the like with the remainder of the components mounted on the transport carrier. Such latter arrangement fosters ease of manipulation of the tractor properly along the crop row. In one preferred embodiment, stationary bars are provided on opposite sides of the plant bed with one of the bars located in front of the other. The two bars through the soil beneath bulb or root products to be harvested to cooperatively define a generally V-shaped cut therearound. In certain fields, however, due to consistency of the soil or other conditions, freely rotatable discs are utilized in lieu of the stationary bars. The two discs then cooperatively pass beneath the product being harvested to again provide a generally V-shaped cut therearound. With horizontal and vertical adjustability for either the blade or disc arrangement, plant beds of different widths may be accommodated, and different cut depths may be realized, tailored to the particular type of product to be harvested. For the harvesting vegetable products, the preparation means in general would not pass through the soil beneath the plant, but would sever the plant at some particular height. For such harvesting, it is preferred and perhaps necessary that the preparation means be located immediately adjacent the entrance to the product lifting and transport means and in fact may be secured thereto. Cut leafy product may then be lifted from the plant bed and conveyed away from the plant bed without disorientation or loss of same.

As to the product lifting and transport means, a pair of opposing rotatable belts are preferred which cooperate to define a product gripping surface therebetween. The two belts are received around respective drive and guide pulleys to define a generally straight passageway therebetween, while encountering idler pulleys intermediate the length of the generally straight passageway. The belts employed are preferably V-belts, or the like which have a resilient surface along an outer surface of same that is adequate in size to preclude contact between the product and the pulleys and which has a particular resilience such that the product embeds in the surface of the belt. Opposing, intermediate idler pulleys are preferably laterally offset from each other, and each is preferably part of a subsystem that is adjustable to permit the idler pulley to impart a predetermined force against its respective belt to increase or decrease the cooperative force between the two belts at the point of the idler pulley and thus properly handle the various products with no, or minimum damage to the product.

Adjacent the discharge end of the lifting and transporting means are opposing rotatable belts which define product orienting means. While preferably continuing to extend angularly upwardly from the lifting and transport means, the opposing rotatable belts pass around pulleys at a rearward, upward end of same that rotate in a plane approximately 90 degrees from the plane of rotation of the pulleys of the pick up and transport means, generating a twist in the belts. As the product moves along the path of travel defined by the belts of the orienting means, the product is transferred from a vertical disposition to a horizontal disposition, according to twist in the belts. Preferably a single pair of opposing belts are employed for both the lifting and transport means and the orienting means with twist in the belts originating at a predetermined location only, along a path of travel of the belts. It should be understood, however, that a separate belt system could be employed for each of the lifting and transport means and orienting means.

A first product support means, preferably a thin conveyor belt is located adjacent the product orienting means, such as the product is transformed to a horizontal disposition, a free upper end of the product is received on the conveyor belt and is supported thereby during continuation of movement of the product through the orienting means. Immediately adjacent the discharge end of the product orienting means, a second means is provided, also preferably a conveyor belt, to receive at least the end of the product that was gripped by the orienting belts, whereby the entire, horizontally disposed product is supported and transported away from the product orienting means. In a most preferred arrangement, the second conveyor belt is split to receive orienting belt pulleys therebetween, with an end of the conveyor belts actually being located beneath the orienting belts. The combined width of the second conveyor is preferably adequate to support substantially the full length of the harvested product, with the first, narrower conveyor belt passing around the path of travel of the second conveyor belt and residing atop same.

A product bin may be provided on the transport carrier opposite the second conveyor belt system, and in fact, may be tilted with the open end of same facing an operator who may simply lift bunches of product from the second conveyor and place same into the bin, with the bulb, root, etc. adjacent a bottom of the bin. When the bin is full and oriented to its normal position with the open portion of same at the top, product in the bin will again assume a vertical disposition for convenient washing, bundling, packaging or the like.

When utilizing a harvester according to teachings of the present invention for the harvesting of bulb or root vegetable products such as green onions, it is quite desirable that the blades, discs or the like being utilized to prepare the product for withdrawal from the plant bed not come adequately close to the root or bulb that damage could be caused thereto. Most desirably, the V-shaped cut, alluded to hereinbefore, is made around the bulb or root, after which the product is lifted from the loosened soil. Generally, the lifted product will retain a significant amount of soil in its root system. Consequently, in order to further prepare the product for cleaning, packaging or the like, a soil removal means is preferably provided beneath the lifting and transport means to engage the root system and to shake or otherwise dislodge the soil therefrom. In a preferred arrangement, an oscillatible bar is provided generally parallel to the path of travel of product through the lifting and transport means which, during oscillation, will engage root system of the product with adequate force to shake the soil therefrom.

DESCRIPTION OF PREFERRED EMBODIMENTS

Figure 1:
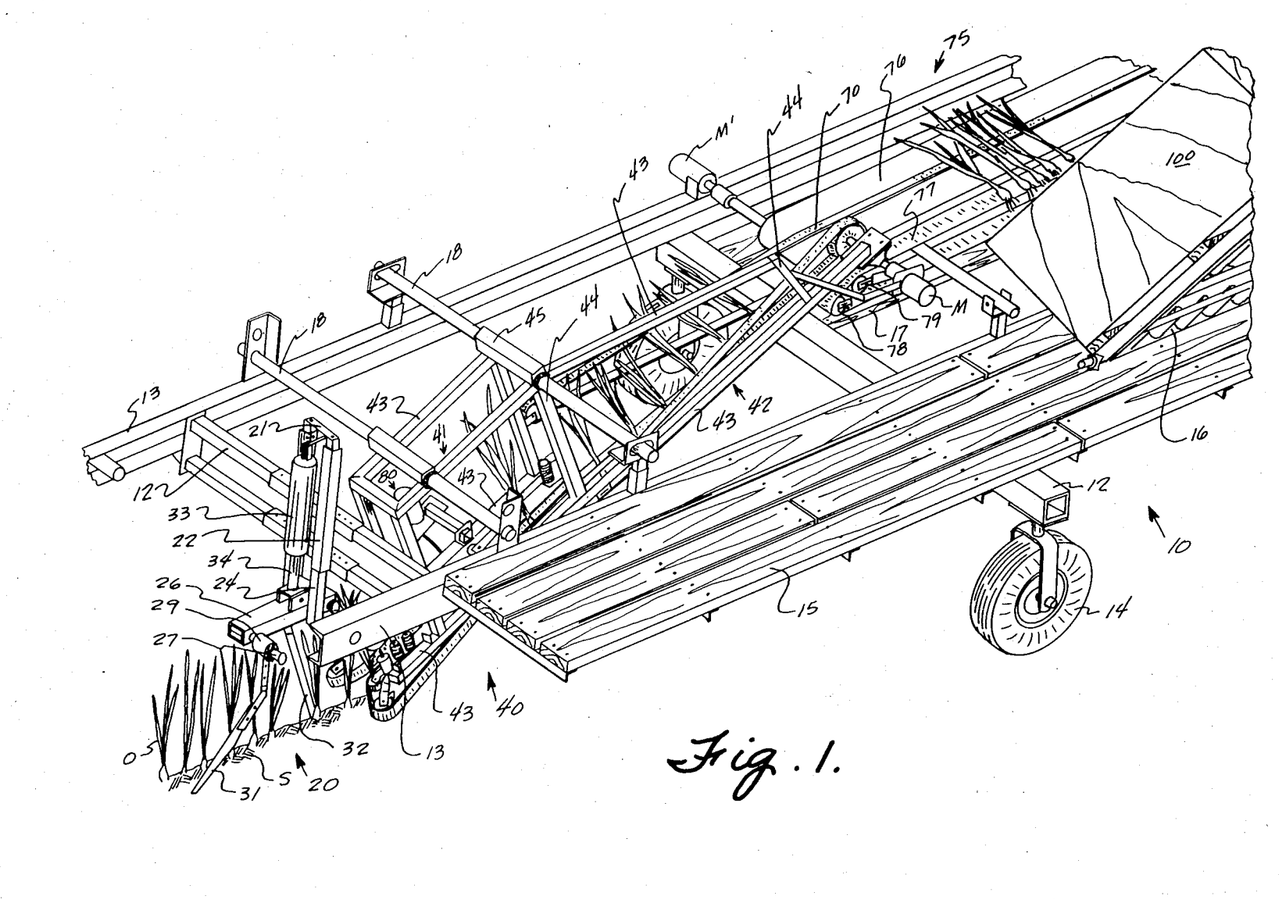
FIG. 1 is an isometric view of a significant portion of the harvester according to teachings of the present invention.
Figure 2:
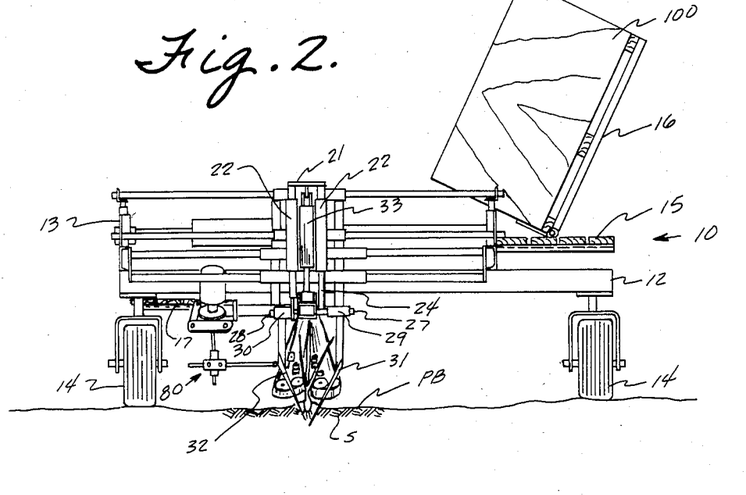
FIG. 2 is a frontal view of the harvester as illustrated in FIG. 1.
Figure 5:
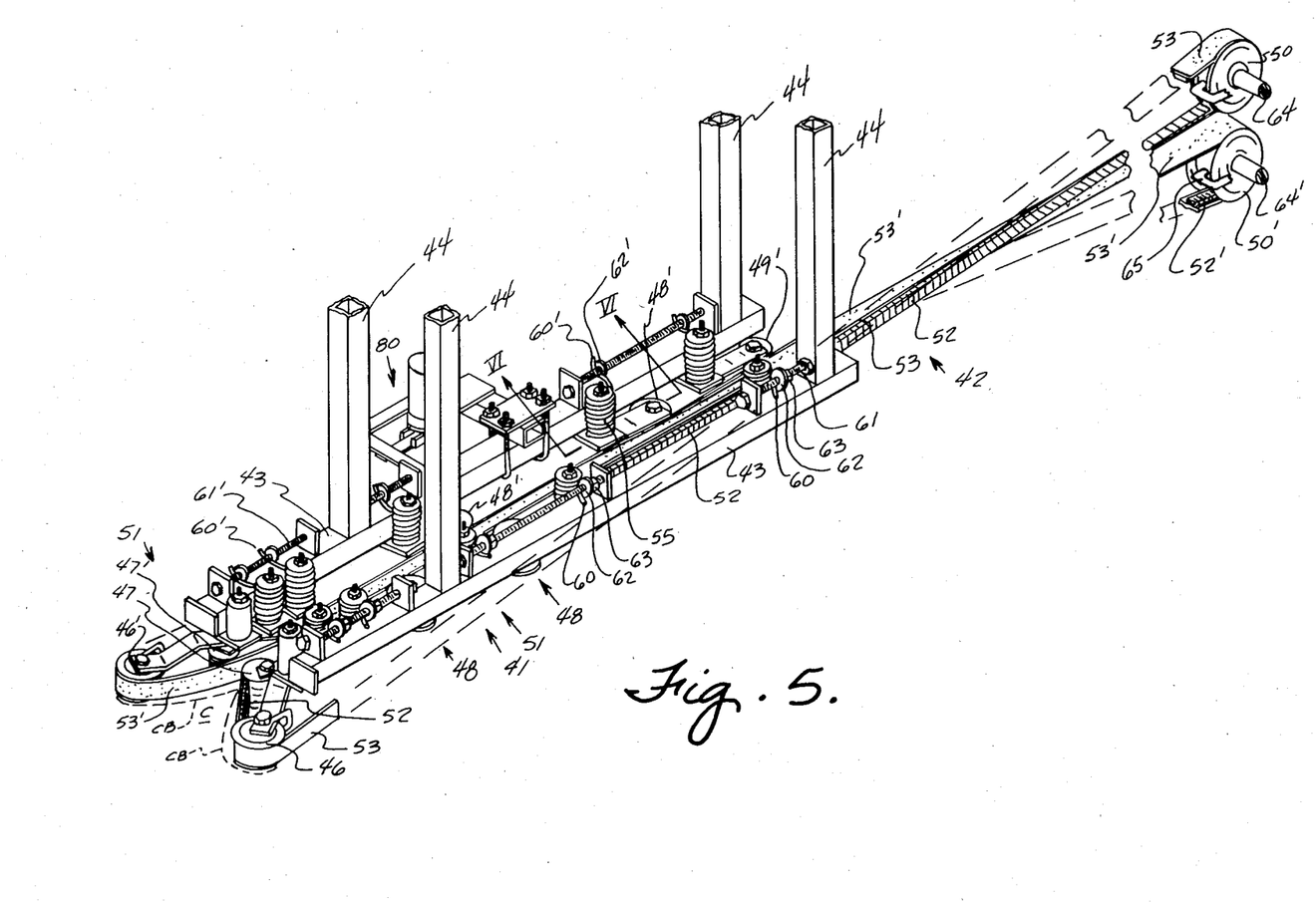
FIG. 5 is an isometric view of the lifting and transport means and product orienting means according to teachings of the present invention.

Making reference to the Figures, preferred embodiments of the present invention will now be described in detail. Referring to FIGS. 1, 2 and 5, the overall scheme of the present invention will be described in detail. Components of the harvester unit, with the possible exception of the product preparation section, are preferably supported on a wheeled transport carrier such as a trailer generally indicated as 10, though if desired, the overall unit could likewise include motorized transport means. From an economical standpoint, however, it is preferred that the harvester of the present invention be supported by trailer 10 and then be towed by a tractor or other transport means. Trailer 10 is skeletal in nature, and is made up of a plurality of crossing struts 12 and longitudinal struts 13 which are appropriately welded or otherwise secured to define an elongated, skeletal framework on which the various components of the harvester may be supported. A plurality of wheels 14 are appropriately secured for rotation in any convenient manner to a crossing strut 12 or otherwise as desired. In a preferred embodiment, a work platform 15 is provided along at least a portion of the length of trailer 10 with a pivotal bulk bin support 16 appropriately secured thereto for a purpose to be described hereinafter. An operator platform 17 may likewise be provided on trailer 10 opposite platform 15 on which an individual may stand to gather the harvested product.

Figure 4:
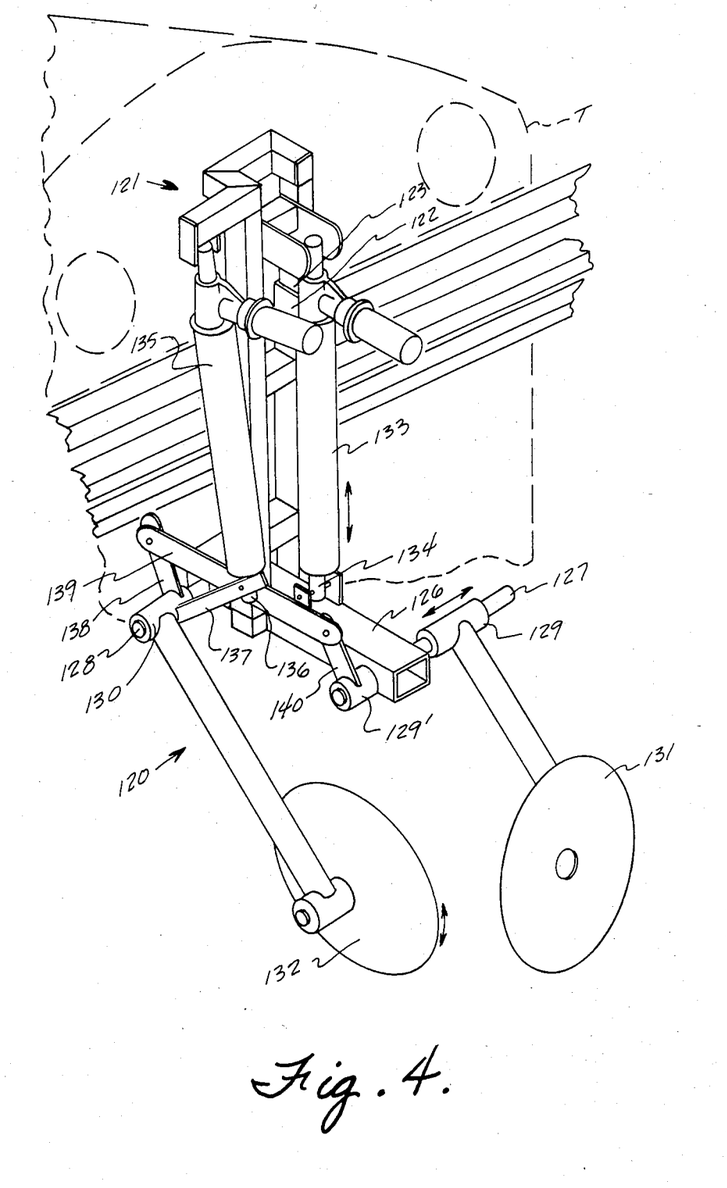
FIG. 4 is an isometric view of one preferred form of the product preparation means segment of the harvester according to teachings of the present invention.

As particularly illustrated in FIGS. 1 and 2, a product preparation means generally indicated by 20 is located at the forward end of trailer 10, (or on the front of a tractor as shown in FIG. 4), followed by a product lifting, transport and orienting means 40, a first product support means 70 and a second support conveying means generally 75. A bulk bin container 100 is received on support 16 that is secured to platform 15, such that a product being harvested may be conveniently removed by an operator from support conveying means 75 and placed within bin 100 for further handling, processing, or the like.

The product preparation means 20 as illustrated in FIGS. 1 and 2, immediately precedes the lifting and transport means 40, though, in certain arrangements, as mentioned above, the product preparation means may be mounted on the front of the tractor as illustrated in FIG. 4 to permit the driver to better steer along the plant bed. Furthermore, as illustrated in phantom on FIG. 5, the product preparation means, particularly for the harvesting of leafy vegetable products, may be cutters that are mounted immediately adjacent the entrance to the lifting and transport means, such as on the front pulleys of same as will be described hereinafter. Product preparation means 20 includes a framework 21 that is secured to either the front of the tractor shown in FIG. 4 or the trailer as shown in FIGS. 1 and 2, with a depending tubular element 22 extending downwardly from opposite side of same. A further tubular element 24 is telescopically associated with tubular element 22 and is secured to a blade receiving support 26. Blade receiving support 26 has a pair of shafts 27 and 28 extending oppositely outwardly from opposite ends of same and on which sleeves 29 and 30, respectively, are secured. As shown in FIG. 1, a blade 31 is secured to sleeve 29 while a second blade 32 is secured to sleeve 30. Blades 31 and 32 are each presented at an angle of about 30 degrees with respect to vertical and are designed to extend downwardly beneath the bulb of the plant (See FIG. 2). Forward blade 31 thus prepares one side of the plant bed PB, while blade 32 prepares the opposite side. With the two blades at an angle of aobut 30 degrees with respect to vertical, and one located behind the other, an overlap condition can be achieved as to the area of cut beneath the bulb of the plant to define a generally V-shaped cut along the plant bed row which loosens the soil around the bulb, etc. and severs the root system, retaining the product in an upright wedged position until mechanically lifting from the plant bed. Since it is desirable to provide lateral adjustability to knives 31 and 32 to accommodate a particular product being harvested, sleeves 29 and/or 30 may be moved laterally along their respective shafts 27, 28. Furthermore, in order to provide depth adjustment to the blades 31 and 32, a hydraulic cylinder or other means 33 is secured at its upper end to frame 21 having a piston rod 34 or the like secured at its outer end to support 26. Vertical movement of piston 34 will thus adjust blades 31 and 32 to a proper cut depth. Moreover, the entire frame may be raised or lowered about wheels 14 by the three point hitch system.

Making particular reference to FIGS. 1, 3, 5 and 6, a preferred product lifting, transport and orienting means generally 40 will be described which includes a lifting and transport section generally 41 and an orienting section generally 42, both of which are defined by a single pair of opposing, rotatable synchronized belts which cooperate to hold the product therebetween. Product lifting, transport and orienting means 40 includes a plurality of struts 43, 44 and 45 that are united to define a skeletal frame. Struts 45 are in fact sleeves which are received over rods 18 of trailer 10 for lateral adjustment therealong, whereby means 40 is capable of lateral adjustment for proper placement with respect to a crop. Two, like, opposing belt systems are provided which cooperatively define functional components of the product lifting, transport, and orienting means 40. A plurality of pulleys 46, 47, 48, 49 (not shown) and 50 are located along the framework defined by struts 43, 44, and 45 to define a path of travel for a belt assembly generally 51, while the opposite belt system includes pulleys 46', 47', 48', 49' and 50' to define a path of travel for a belt assembly generally 51'. Note that pulleys 46, 46' and 50, 50' are provided with stationary rods 65 which extend into the sheave of the pulleys opposite the area of belt contact. Rods 65 continue to clean pulleys 46, 46', 50, 50' of soil and other debris that may collect therein during the harvesting operation.

Figure 3:
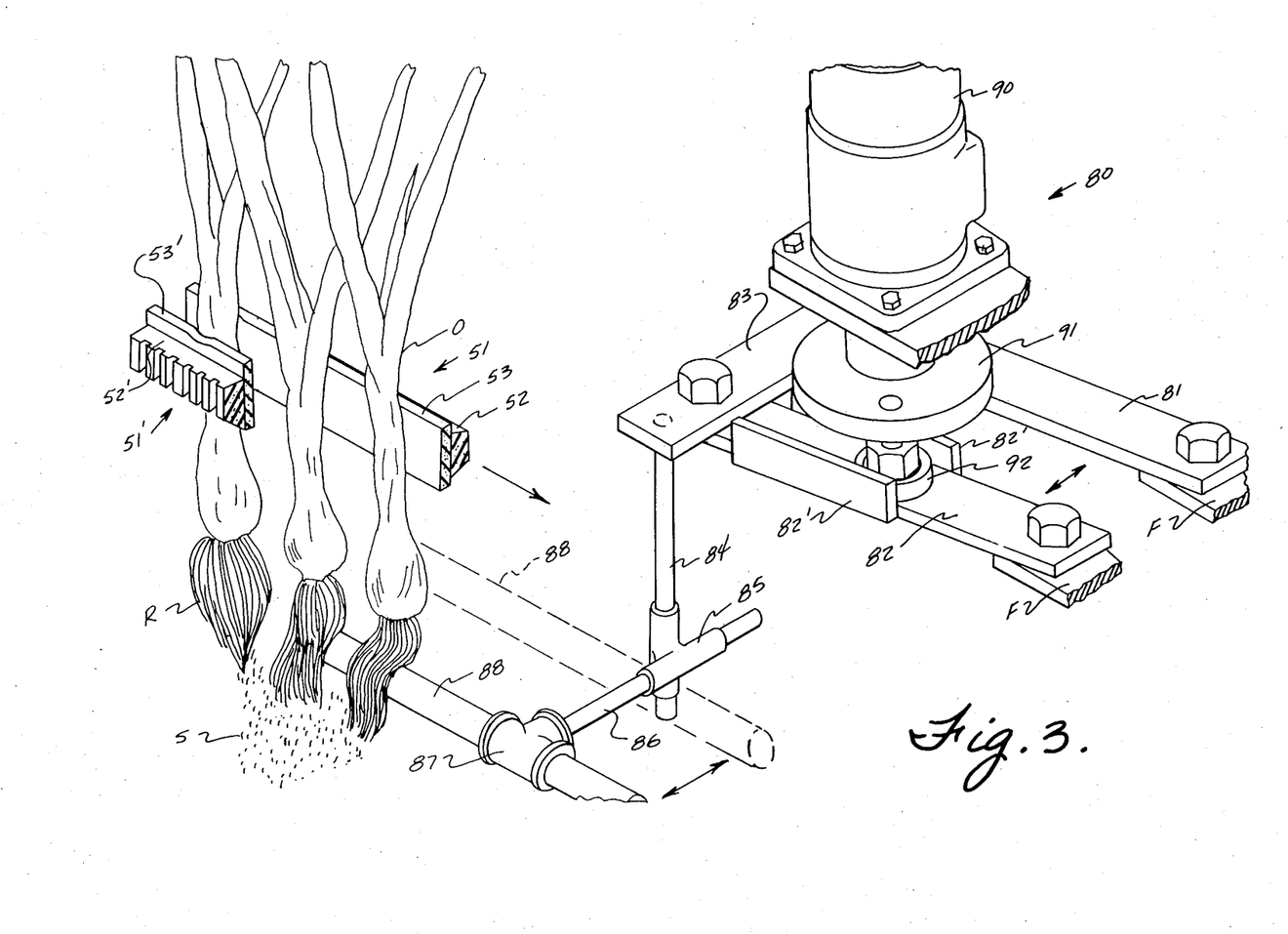
FIG. 3 is an isometric view of the soil dislodging means according to teachings of the present invention.

As may be best shown in FIG. 3, belt assemblies 51 and 51' include a V-belt, or the like 52 and 52' respectively, for proper association with the various pulleys. A resilient product contact facing 53, 53' of a polymeric material, rubber, or similar material is secured to an outer face of belts 52, 52' by adhesive bonding or the like. The belt facing 53, 53' preferably have a durometer hardness of about 15 which enables the portion of the product engaged thereby to partially embed in same for a preferred holding arrangement. As is particularly illustrated in FIG. 3, facing strips 53, 53' are wider than the widest portions of belts 52, 52' and of course add thickness thereto, whereby, while belt assemblies 51, 51' appropriately ride in the sheaves of the various pulleys along the path of travel, contact between the product and the outer rims of the pulleys is precluded by facing strips 53, 53'.

Pulleys 46, 47 and 49, 46', 47', and 49' located at opposite ends of the product lifting and transport section 41 generally define a path of travel for belts 51, 51', while pulleys 49, 49' and 50, 50' define a path of travel for belts 51, 51' through orienting section 42. Cooperative association of belts 51 and 51' defines a converging section C in the space between pulleys 46 and 47, 46' and 47', into which prepared product passes and may be guided by belts 51 and 51' into a generally axial passageway therebetween along the remainder of product lifting and transport section 41. Along the axial portion of section 41 are a plurality of idler pulleys 48, 48', all of which are not shown. Each of the intermediate idler pulleys 48, 48', are arranged as depicted in cross section in FIG. 6, whereby pulleys 48, 48' may impart a predetermined force against belts 51, 51' thereat. With the exception of the pulleys immediately following the belt converging zone C of section 41, and pulleys 49, 49' at the end of section 41, the remainder of the intermediate idler pulleys 48, 48' along the length of section 41 are offset from each other, such that a force may be applied thereby against belts 51, 51' as the case may be, without interference from a counterforce provided by an opposing pulley 48, 48'. Hence, pulleys 48, 48' are staggered along the axial intermediate length of the transport section 41.

Figure 6:
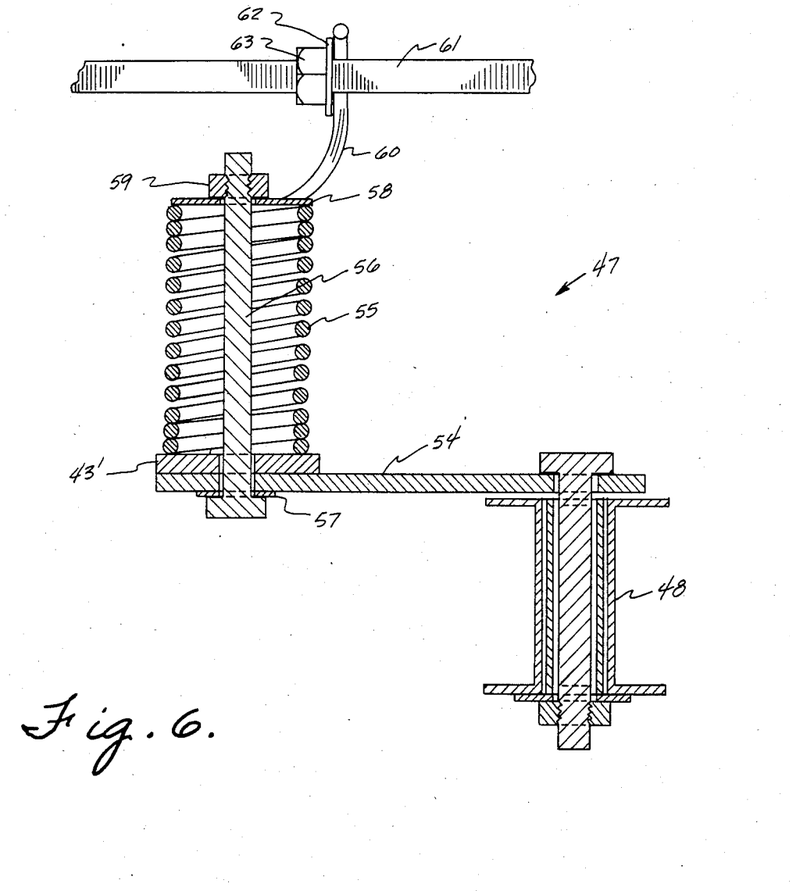
FIG. 6 is a vertical cross sectional view of an adjustable idler pulley system utilized in the pick up and transport means of the present invention.

Making particular reference to FIG. 6, the assembly for providing an adjustable force on belts 51, 51' via pulleys 48, 48' is specifically illustrated. A torque bar 54 is pivotally secured at one end to a plate 43' that extends outwardly from strut 43, and has a freely rotatable pulley 48 mounted for rotation at an opposite end of same. A spring means 55 resides atop plate 43' and is secured to frame plate 43' and torque bar 54 by a bolt 56 that passes through a washer 57, torque bar 54, frame plate 43', spring 55, and a spring cap 58. A nut 59 unifies the connection. Torque plate 54, depending upon spring pressure from spring 55, may thus pivot about bolt 56 towards or away from its respective belt 51 and cause pulley 48 to apply more or less pressure against belt 51. Spring 55 has a pigtail section 60 that extends upwardly around a threaded bar 61, which is secured to a portion of the frame, and makes engagement with a washer 62 held in place by a nut 63. Threaded movement of nut 63 along threaded bar 61 will thus bring about proportionate movement of spring pigtail 60 which in turn applies a particular torque to spring 55 which is imparted through torque bar 54 to idler pulley 48. In this fashion, a predetermined torque force may be applied by each idler pulley 48, 48' against belts 51, 51' respectively to control the cohesive forces between belts 51, 51' on a product passing thereby. Such type of adjustment permits various types of products to be handled either snugly or loosely depending upon the requirements of the product without damage thereto. Belts 51, 51' passing along the intended pathway of each, as defined by the respective guide and idler pulleys, cooperate to receive the prepared product, lift the product from the soil, and transport the product in vertical disposition to the product orientation section or means generally indicated as 42.

Product orienting section 42 of lifting, transport and orienting means 40, as mentioned above, is located between pulleys 49 (not shown), 49' and pulleys 50, 50'. Pulley 49 which is not shown is located directly across from pulley 49', with both pulleys 49, 49' being adjustable in like fashion as illustrated for idler pulleys 48, 48' in FIG. 6. End pulleys 50, 50' rotate about horizontal axes on shafts 64, 64', while the remainder of the pulleys described above rotate about vertical axes. Hence immediately upon leaving the influence of opposite pulleys 49, 49', belts 51, 51' begin to twist. Pulleys 50, 50' are located with respect to each other such that the cooperative product gripping force between belts 51, 51' remains throughout twisting of belts 51, 51'. In other words, there is a 90 degree shift in the disposition of belts 51, 51' such that as product leaves the area of pulleys 49, 49' in a vertical disposition, both belts and product follow the same twist through approximately 90 degrees whereby the product is horizontally disposed at the end of orienting section 42. Shown in phantom in FIG. 5 is a further embodiment of the present harvester. A pair of cutter blades CB are secured adjacent the entrance to product lifting, transport, and orienting means 40. When harvesting leafy green vegetables, blades CB may be so positioned to sever the leaves just above the plant bed after the leaves are gripped by belts 51, 51'. Alternatively a pair of overlapping disc cutters may likewise be employed.

Making further reference to FIG. 1, green onions O are illustrated as passing through the harvester. Note that along the onion pick up and transport means 41, the onions are vertically disposed and, when transferred from the transport means 41 to the orientation means 42, the products continue to remain in a vertical orientation. As belts 51 and 51' twist, however, the tops of the green onions begin to lean. In order to preclude the excess weight of the top disrupting the gripping pressure between belt surfaces 53 and 53', a first support means 70 is provided along at least a portion of orienting section 42. In FIG. 1, support means 70 illustrated as a thin V-belt conveyor though obviously any moving or stationary support means, such as a highly polished rod, could be utilized so long as proper continuance of product flow is not interrupted thereby. As the onion tops begin to lean, they are located over conveyor belt 70 such that the tops will ultimately make contact with conveyor belt 70 and be supported thereby during further movement of the onions through the orienting section 42. Thereafter, once the product, such as the green onions, is in the horizontal disposition and exits from the product orienting section 42, same is deposited onto a second, conveyor support means generally indicated as 75 which in a preferred embodiment, comprises a pair of side by side conveyor belts 76 and 77. As can be seen in FIG. 1, space is provided between conveyor belts 76 and 77. Pulleys 50 and 50' of orienting section 42 reside in a vertical plane within the space between belts 76 and 77, such that product passing from between belts 51 and 51' will be deposited directly onto conveyor belts 76 and 77. A hydraulic motor M is illustrated as providing driving power to shaft 64 and thus to pulley 50, while a further hydraulic motor M' affords driving power to shaft 64' and then to pulley 50'. Motors M and M' are hydraulically in series and preferably have like volumetric displacement whereby belts 51, 51' rotate synchronously. While motor M' is fixed, motor M is adjustable along with pulley 50 to control space between belts 51, 51' at the exit from same. Additionally, a drive cylinder (not shown) about which conveyor belts 76 passes is also located on shaft 64' and is driven by motor M'. A cylinder (not shown) about which belt 76 is received at an opposite end affords driving power to belt 77. Idler pulleys 78 and 79 are received on an opposite end of belt 77, with pulley 78 adjustable to ensure proper transfer of product onto belt 77. Once the harvested product is in the horizontal disposition on conveyor belts 76 and 77, an operator standing on platform 17 of trailer 10 can simply gather same in bunches and deposit them into bulk bin container 100. Once container 100 is full, support 16 may be pivoted downwardly and container 100 rolled therefrom, lifted by a forklift or the like. A further, empty container can then be placed on support 16, and pivoted to a proper located to receive further product.

As also illustrated in FIG. 1, first support means 70 passes in contact with an upper surface of conveyor belt 76, and as such, avoids a possible disruption of transport product. With the arrangement shown, there is adequate frictional force between support means 70 and conveyor belt 76 such that driving motion imparted to conveyor belt 76 likewise imparts a driving motion to support means 70.

As best illustrated in FIGS. 2 and 3, a soil removal means generally 80 is provided for contacting the root system of the product after the product has been lifted from the plant bed PB to dislodge soil that may be clinging thereto. As particularly illustrated in FIG. 3, onions have been removed from the plant bed by lifting and transport section 41 and are being held between belts 51 and 51' moving in the direction shown by the arrow. Once the onions have been lifted from the plant bed, the root system R is engaged by an oscillating bar 88 to dislodge the soil S, which simply falls back to the plant bed. In a preferred embodiment, a pair of supports 81 and 82 are pivotally secured to portions F of the frame for lifting, transport, and orienting means 40 for movement in the direction of the arrows indicated between the elements. A cross member 83 is secured at the outer free ends of support members 81 and 82 and has a vertically oriented rod 84 secured thereto and extending downwardly therefrom to a coupling 85. A horizontally disposed rod 86 is also received by coupling 85 and extends to a tee coupling 87 which also receives shaker rod 88. Support 82 has a pair of side members 82' secured thereto that define a slide S therebetween. A hydraulic motor 90 is shown rigidly secured to a portion of the frame, the shaft of which (not shown) is connected to an eccentric 91 that has a follower 92 secured thereto which is received between side elements 82' of support 82. When rotary shaft motion is provided by motor 90, eccentric 91 rotates with follower 92 moving up and down slide S between side elements 82', imparting an oscillating motion to shaker bar 88 between the illustrated position in contact with the onion roots R and the non-contact position shown in phantom. In this fashion, as mentioned above, soil that clings to the root system R of the onions or other products may be dislodged therefrom without damage to the bulbs or tops of the products and redeposited onto plant bed PB. In a most preferred embodiment, hydraulic motor 90 is a variable speed motor such that oscillating frequency of shaker bar 88 may be varied to accommodate varying root and soil conditions.

A further embodiment of the product preparation means 20 of FIGS. 1 and 2 is illustrated in FIG. 4, mounted to the front of a tractor T, (illustrated in part). Front location of preparation means 90 enables the tractor driver to visually observe the operation and make steering corrections if needed. A support frame generally 121 is provided which includes vertical tubular elements 122 and 123 in telescopic association. A disc support plate 126 is secured to a lower end of element 122 and receives shafts 127 and 128 on opposite ends of same and extending from opposite sides of same, about which collars 129 and 130 for discs 131 and 132 may be received which are straight Coulter discs. A linear actuator 133, rod 134 arrangements or some other vertical adjustable means is secured between elements 123 and 126 such that support 126 and accordingly discs 131 and 132 may be vertically adjusted. Additionally, since the product preparing means 120 is mounted to the front of the tractor, as opposed to being mounted on a trailer 10 as shown in FIGS. 1 and 2, it is further necessary to enable movement and inoperative modes.

A further linear actuator 135, rod 136 arrangement, or the like, is secured between a portion of frame 121 that moves up and down with the discs 131 and 132, and an arm 137 that is secured to collar 130. Collar 130 is further connected to a collar 129' on shaft 127 via linkage 138, 139, 140. Accordingly, should actuator 135 be actuated to expel rod 136 therefrom, the arm 137 between rod 136 and collar 130 causes disc 132 to pivot downwardly about shaft 128 while linkage elements 138, 139 and 140 cause shaft 127 to rotate in a clockwise direction and to move disc 131 downwardly, both then being in an operative mode. Retraction of rod 136 into actuator 135 raises discs 131 and 132 to an inoperative mode, as illustrated, such that no contact would be made between discs 131 and 132 and the soil. It should be noted that the product preparation means of FIG. 4 utilizes a pair of rotatable discs 131 and 132 instead of the cutting bars or blades as described with respect to FIGS. 1 and 2 though both are interchangeable. In certain dense highly compacted soils, it is difficult, if not virtually impossible, to move the stationary blades through the plant bed, and in fact, under such conditions, it oftentimes is virtually impossible for an individual to manually extract the onion plant from the plant bed. Accordingly, when utilizing discs such as 131 and 132 which are freely rotatable on their respective supports, less resistance is encountered and the product to be harvested may be properly prepared.

Whereas hydraulic motors, cylinders, and linear actuators have been set forth above, obviously other electrical or mechanical drive means may be employed. Moreover, since the particular hydraulic connections to the motors and cylinders do not, per se, form a part of the present invention, and are well known to those skilled in the art, the connections have not been illustrated.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved mechanical harvester for bulb, root, and leafy vegetable products, comprising:
   (a) means for preparing said products for removal from a row plant bed in which said products are growing;
   (b) first conveyor means located rearwardly of said preparing means for engaging prepared ones of said products with a predetermined pressure sufficiently low to prevent damage thereto, lifting said prepared ones from said plant bed in an initial vertical disposition and transporting lifted ones of said products upwardly and rearwardly;
   (c) product orienting means, located along said first conveyor means and rearwardly of said means for preparing, for orienting said lifted ones of said products from said vertical disposition thereof to a horizontal disposition while maintaining association of such products with said first conveyor means;
   (d) soil removal means, located rearwardly of said means for preparing and forwardly of said orienting means, for imparting reciprocal horizontal motion to a member thereof coming into contact with lifted ones of said products so as to remove soil therefrom;

(e) support means located adjacent said product orienting means for supporting a formerly upper end of oriented ones of said products whenever same are oriented to said horizontal disposition; and f second conveyor means, located adjacent an output end of said first conveyor means for receiving ones of said products therefrom, whereby said horizontally disposed ones are thereby freed from said first conveyor means and made accessible for further processing or packaging.

2. An improved harvester as defined in claim 1, further comprising means for transporting said harvester along said plant bed.

3. An improved harvester as defined in claim 1 wherein said preparing means comprise a pair of stationary blades angularly presented to pass through the plant bed soil generally beneath said product along opposite sides of same, said blades cooperating to make a generally V-shaped cut along said plant bed, with one of said blades being disposed forward of the other so as to prevent packing of soil therebetween.

4. An improved harvester as defined in claim 3 wherein said blades are disposed at an angle of about 30 degrees with respect to vertical.

5. An improved harvester as defined in claim 1 wherein said preparing means comprise a pair of freely rotatable discs angularly presented to pass through the plant bed soil generally beneath said product along opposite sides of same, said discs cooperating to make a generally V-shaped cut along said plant bed without overlapping each other, and with one of said discs being disposed forward of the other so as to prevent packing of soil therebetween otherwise caused by opposing blades.

6. An improved harvester as defined in claim 5 wherein said discs are disposed at an angle of about 30 degrees with respect to vertical.

7. An improved harvester as defined in claim 1 wherein said first conveyor means comprise a pair of oppositely facing rotatable belts which cooperate to grip a portion of the product above the plant bed, lift same from the plant bed, and transport same, said belts including a resilient product engaging means for imparting said predetermined pressure against products being held therebetween and for partially enveloping such products.

8. An improved harvester as defined in claim 7 wherein said belts engage a series of idler pulleys intermediate the length of a product passageway defined therebetween with at least one of said pulleys operatively associated with one of said belts being laterally offset from at least one other of said idler pulleys operatively associated with the other of said belts, said idler pulleys being adapted to impart a predetermined force against the belt passing in contact therewith whereby product gripping pressure by said belts can be controlled.

9. An improved harvester as defined in claim 8 wherein said idler pulleys are received for rotation on a free end of a support element, an opposite end of said support element having spring means associated therewith, said spring means being adjustable to apply a predetermined torque on said free end of said support element which is translated into a force imparted by said idler pulley against its respective belt.

10. An improved harvester as defined in claim 1 wherein said product orienting means comprise two pairs of opposed rotatable pulleys, disposed so to cause said first conveyor means to be twisted by about 90 degrees over a portion thereof such that products held therebetween gradually change from an initial vertical to a horizontal disposition.

11. An improved harvester as defined in claim 1 wherein said first conveyor means and said product orienting means are defined by a single pair of opposing rotatable belts, said belts defining a lifting and transport section and an orienting section, said belts defining a generally straight product passageway along said pickup and transport section and contacting variable force idler pulleys therealong, and said belts twisting together in said orienting section whereby said product passageway therebetween transforms from a generally vertical passageway to a generally horizontal passageway.

12. An improved harvester as defined in claim 11 wherein a pair of intermediate, opposed idler pulleys disposed at the end of said lifting and transport section prevents twisting of said belts until same enter the start of said orienting section.

13. An improved harvester as defined in claim 1 wherein said support means comprises a driven belt.

14. An improved harvester as defined in claim 1 wherein said second conveyor means comprises at least one driven belt.

15. An improved harvester as defined in claim 14 wherein said support means comprises a first driven belt and wherein said first driven belt is less in width than said at least one driven belt of said second conveyor means, and said first driven belt encompasses the rotational path of said driven belt of said second conveyor means.

16. An improved harvester as defined in claim 2 wherein said member of said soil removal means comprises an elongated rod element located along the path of travel of said first conveyor means, and said soil removal means further comprises means for oscillating said rod with controllable amplitude and frequency, and responsive to the speed at which said harvester is transported along said plant bed.

17. An improved harvester for bulb, root, and leafy vegetable products grown in rows in a plant bed, comprising:

(a) product preparation means transportable along opposite sides of said products and extending into the soil beneath opposite sides of rows of said products for loosening said products to prepare for removal of same from said plant bed and for severing root systems of same;

(b) a single pair of inclined, opposing rotatable belts located rearwardly of said product preparation means, said belts having resilient inner linings so as to define a protected product passageway therebetween, and cooperating to grip with predetermined pressure on opposing sides thereof ones of said product adjacent said plant bed, lift gripped ones of said product from said plant bed, transport lifted ones of said product away from said plant bed and orient said product during said transport thereof from an initial vertical to a horizontal disposition;

(c) a rod mounted for oscillation in a horizontal plane and located beneath and adjacent a portion of the path of travel of said pair of belts, and means for controllably oscillating said rod so as to repeatedly contact with a portion of said product extending below said pair of belts and thereby dislodge soil therefrom by such contact;

(d) support means, located along at least a portion of the path of travel of said pair of belts, for receiving and supporting an upper portion only of oriented ones of said products so as to maintain horizontal disposition thereof without harm to same; and (e) conveyor means, located adjacent an exit end of said product passageway, for receiving and supporting at least a lower portion of horizontally disposed ones of said products having exited said product passageway, whereby said products are then free from said pair of belts for further handling.

18. An improved harvester as defined in claim 17 wherein said product preparation means are adapted for vertical and horizontal adjustment.

19. An improved harvester as defined in claim 18, further comprising transport means for transporting said harvester relative said plant bed so as to encounter said rows of products.

20. An improved harvester as defined in claim 19 wherein said product preparation means are mounted on a forward-most portion of said transport means for ease of an operator in piloting same along said rows of products, and the remainder of said harvester is associated with said transport means rearward from said product preparation means.

21. An improved harvester as defined in claim 17 comprising further a wheeled harvester carrier, with all recited components of said harvester being associated therewith.

22. An improved harvester as defined in claim 21 wherein said wheeled harvester carrier further has a product receiving bin received thereon adjacent said conveyor means and an operator platform adjacent an opposite side of said conveyor means, whereby an operator standing on said platform may remove horizontally disposed products from said conveyor means and place same in said product bin.

* * * * *